US012630233B2

(12) United States Patent (10) Patent No.: US 12,630,233 B2
Hatch et al. (45) Date of Patent: May 19, 2026

(54) BED STIFFENER ASSEMBLY FOR TRUCKS

(71) Applicant: Wheel Pros, LLC, Greenwood Village, CO (US)

(72) Inventors: Thomas Hatch, Descanso, CA (US); Clinton Johnson, Descanso, CA (US)

(73) Assignee: Wheel Pros, LLC, Greenwood Village, CO (US)

( * ) Notice: Subject to any disclaimer, the term of this patent is extended or adjusted under 35 U.S.C. 154(b) by 554 days.

(21) Appl. No.: 18/121,793

(22) Filed: Mar. 15, 2023

(65) Prior Publication Data

US 2023/0322308 A1 Oct. 12, 2023

Related U.S. Application Data

(60) Provisional application No. 63/328,967, filed on Apr. 8, 2022.

(51) Int. Cl.
B62D 33/02 (2006.01)
B62D 33/023 (2006.01)

(52) U.S. Cl.
CPC ........... B62D 33/02 (2013.01); B62D 33/023 (2013.01)

(58) Field of Classification Search
CPC ........ B62D 21/03; B62D 21/09; B62D 21/18; B62D 25/2036; B62D 25/2054; B62D 27/065; B62D 33/02; B62D 33/023
USPC ...................................................... 296/183.1
See application file for complete search history.

(56) References Cited

U.S. PATENT DOCUMENTS

| | | | | | |
|---|---|---|---|---|---|
| 1,636,412 | A | * | 7/1927 | Gallowitz | ............... F16B 12/50 |
| | | | | | 410/71 |
| 7,665,800 | B2 | * | 2/2010 | Werner | ................... B62D 33/02 |
| | | | | | 296/183.1 |
| 9,126,630 | B1 | * | 9/2015 | Gallagher | ............ B62D 27/023 |
| 10,793,201 | B1 | * | 10/2020 | Johnston, VII | ......... B32B 5/024 |
| 11,724,752 | B2 | * | 8/2023 | Kiefer, IV | ........... B62D 33/023 |
| | | | | | 296/191 |
| 2003/0218360 | A1 | * | 11/2003 | Henderson | ............. B62D 33/02 |
| | | | | | 296/182.1 |
| 2009/0026786 | A1 | * | 1/2009 | Reich | ........................ B60R 9/00 |
| | | | | | 296/37.6 |
| 2018/0118280 | A1 | * | 5/2018 | Marchlewski | ....... B62D 33/023 |
| 2019/0233021 | A1 | * | 8/2019 | Hihara | ................... B62D 33/02 |
| 2021/0237807 | A1 | * | 8/2021 | Stibich | ................. B62D 33/023 |
| 2023/0016143 | A1 | * | 1/2023 | Kiefer, IV | ........... B62D 33/023 |
| 2023/0322308 | A1 | * | 10/2023 | Hatch | .................... B62D 33/02 |
| | | | | | 296/183.1 |
| 2024/0351642 | A1 | * | 10/2024 | Dylewski, II | ........ B62D 33/023 |

* cited by examiner

*Primary Examiner* — Gregory A Blankenship
(74) *Attorney, Agent, or Firm* — Womble Bond Dickinson (US) LLP

(57) ABSTRACT

A bed stiffener assembly for truck boxes. The bed stiffener assembly is mounted within side walls and below a floor panel of the truck box, enhancing the structural integrity of the truck box in a way that is unobtrusive to loading/ unloading and that maintains the factory appearance of the truck box. Stiffener brackets are mounted directly to a support pillar and adjacent cross member to provide lateral stiffness. In addition, a corner bracket may be implemented to provide stiffness in the fore/aft directions, enhancing resistance to twisting of the truck bed.

51 Claims, 12 Drawing Sheets

13, 34b, 186

46

42

45

32, 32b

152

32

122, 124

122, 124

102

112      114

112      114

104

154

BED STIFFENER ASSEMBLY FOR TRUCKS

CROSS REFERENCE TO RELATED APPLICATIONS

This utility patent application claims priority back to U.S. Provisional No. 63/328,967, filed 2022 Apr. 8, the contents of which are incorporated by reference into this application.

STATEMENT REGARDING FEDERALLY SPONSORED RESEARCH OR DEVELOPMENT

This invention was not federally sponsored.

FIELD OF THE DISCLOSURE

This disclosure is directed generally to automotive body accessories and more specifically to stiffening structures for truck beds.

BACKGROUND

Campers and bed racks are known to overload the side walls of truck boxes, causing the side walls to flex laterally outward. Excessive or repeated flexing, for example as experienced while traversing off-road terrain, can cause fracturing and failure of the truck bed. An assembly that reinforces the truck bed to mitigate such failures would be welcomed.

SUMMARY OF THE DISCLOSURE

Various embodiments of the disclosure provide a truck box reinforcement assembly that is hidden from view for full, uninterrupted access to the truck box while maintaining the original sleekness of the truck box. The disclosed assembly reduces the risk of truck box damage or failure and the attendant cost of replacing truck body parts. The risk of loss or damage to loads attached to the truck box is also diminished, thereby increasing overall safety of the vehicle. In some embodiments, reinforcement of the rear corner uprights prevents bowing of the side walls in the vicinity of the tailgate, thereby reducing the risk of gate latch failure and loss of payload.

A conventional bed stiffener 20 is depicted at FIG. 1. Conventional bed stiffeners are essentially a flanged gusset 22 where the flanges 24 are mounted to the inside of a truck box through a liner 26 with fasteners 28. The gusset 22, flanges 24, and fasteners 28 are disposed in the cargo area of the truck box, and obstruct the cargo area and access thereto. Mounting to the composite bed through the liner 26 instead of to the structural framework attenuates the stiffness and efficacy of the conventional bed stiffener 20.

The disclosed bed stiffener assembly is disposed within the side walls (between the inner and outer panels) and below the floor panel of the truck box, so that the cargo area and access thereto is not inhibited. The disclosed stiffeners are mounted directly to the framework (support pillars and cross member) of the truck box enhanced strength relative to conventional stiffeners that are mounted to the composite bed. In some embodiments, in addition to providing lateral stiffness to the side walls, the bed stiffener assembly provides additional axial (fore and aft) stiffness of the truck box for enhanced strength and resistance to twisting.

Structurally, a bed stiffener assembly for a truck box, comprising a stiffener bracket that includes a vertical leg configured for attachment to a mounting face of a support pillar of a truck box and between an inner panel and an outer panel of the truck box, the vertical leg defining at least one mounting hole, and a horizontal leg that depends from the vertical leg, the horizontal leg being configured for attachment to a mounting face of a cross member of the truck box and underneath a floor panel of the truck box, the horizontal leg defining a plurality of mounting holes.

The vertical leg and the horizontal leg define a flush contact surface for registration against the support pillar and the cross member. A fastening assembly includes a plurality of fasteners, each fastener being associated with a corresponding mounting hole of the plurality of mounting holes of the horizontal leg for coupling the fastening assembly to the horizontal leg of the stiffener bracket. A mounting bracket defines at least one mounting hole, each of the at least one mounting hole being associated with a corresponding mounting hole of the at least one mounting hole of the vertical leg for coupling the mounting bracket to the vertical leg of the stiffener bracket.

In some embodiments, the mounting bracket is a corner bracket that defines the at least one mounting hole on a first tab and at least one mounting hole on a second tab, said first tab being non-parallel to said second tab. Some embodiments include an anchor plate for coupling to the second tab of the corner bracket. The anchor plate may include a tie down bracket that defines a plurality of through-apertures. In some embodiments, the tie down also includes a bottle opener.

Various embodiments of the disclosure include a method for installing components of the bed stiffener assembly for stiffening a truck box, comprising: providing a kit that includes a bed stiffener bracket, and providing a set of installation instructions on a tangible, non-transitory medium, the installation instructions including: securing a stiffener bracket to a first face of a support pillar of a truck box, the first face of the support pillar being between an inner panel and an outer panel of a side wall of the truck box; and securing the stiffener bracket to a first face of a cross member that extends below the support pillar, the first face of the cross member being underneath a floor panel of the truck box. In some embodiments, the kit provided in the step of providing the kit includes a mounting bracket, and the installation instructions provided in the step of providing the installation instructions include: positioning the mounting bracket on a second face of the support pillar, the second face of the support pillar being opposite the first face of the support pillar; coupling the stiffener bracket to the mounting bracket to secure the stiffener bracket to the first mounting face of the support pillar. In some embodiments, the kit provided in the step of providing the kit includes an anchor plate, and the installation instructions provided in the step of providing the installation instructions include: positioning the mounting bracket on a third face of the support pillar, the third face of the support pillar extending orthogonally to the second face of the support pillar; positioning the anchor plate on a fourth face of the support pillar, the fourth face of the support pillar extending orthogonally the first face of the support pillar; coupling the anchor plate to the mounting bracket to secure the mounting bracket to the third mounting face of the support pillar. In some embodiments, the kit provided in the step of providing the kit includes a fastener assembly, and the installation instructions provided in the step of providing the installation instructions include: positioning a backing plate of the fastener assembly to a second face of the cross member, the second face of the cross member being opposite the first face of the cross member;

and coupling the stiffener bracket to the backing plate to secure the stiffener bracket to the first mounting face of the cross member.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE DRAWINGS

Figure 1:
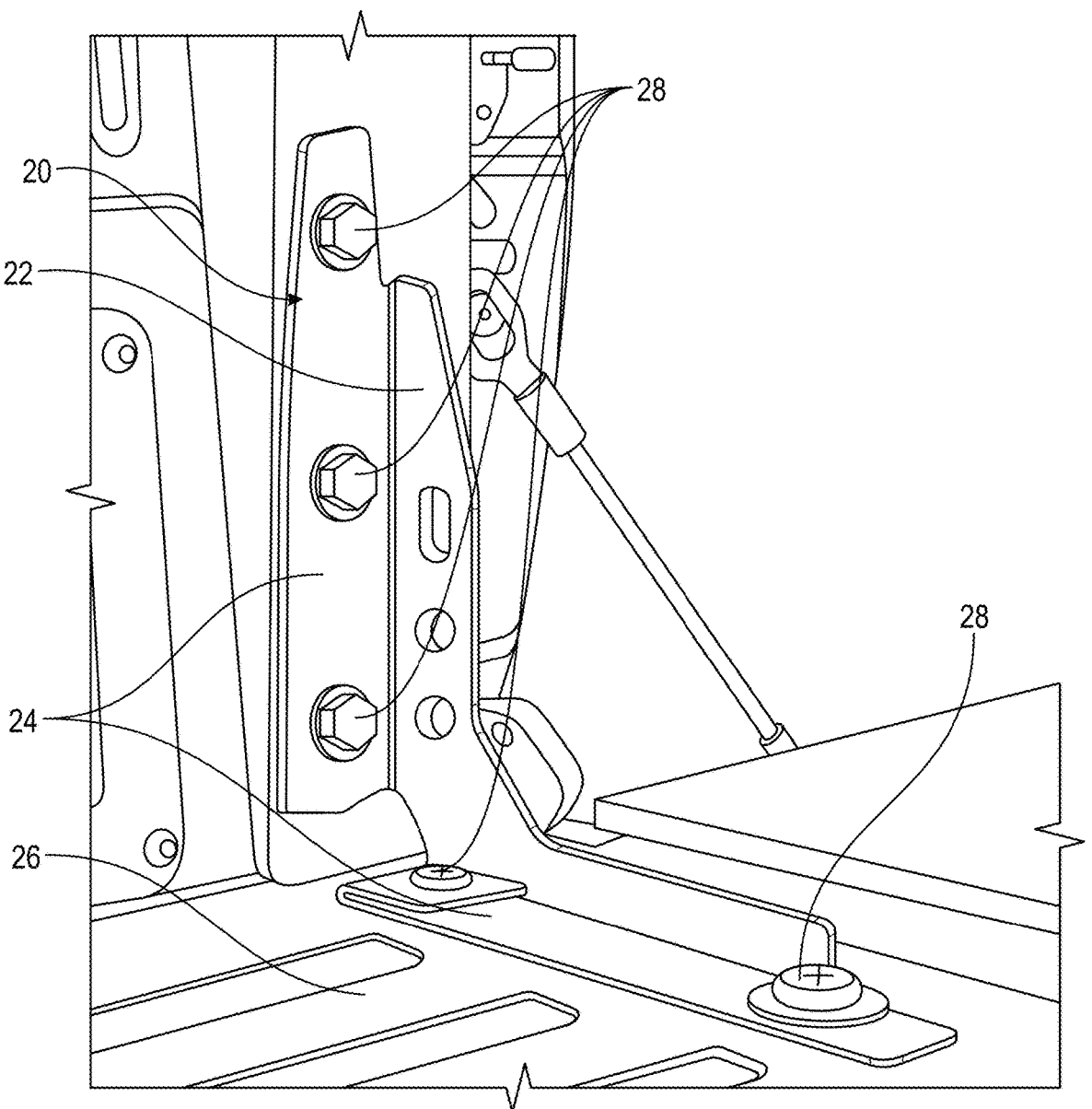
FIG. 1 is a perspective view of a conventional bed stiffener for a truck box.
Figure 2:
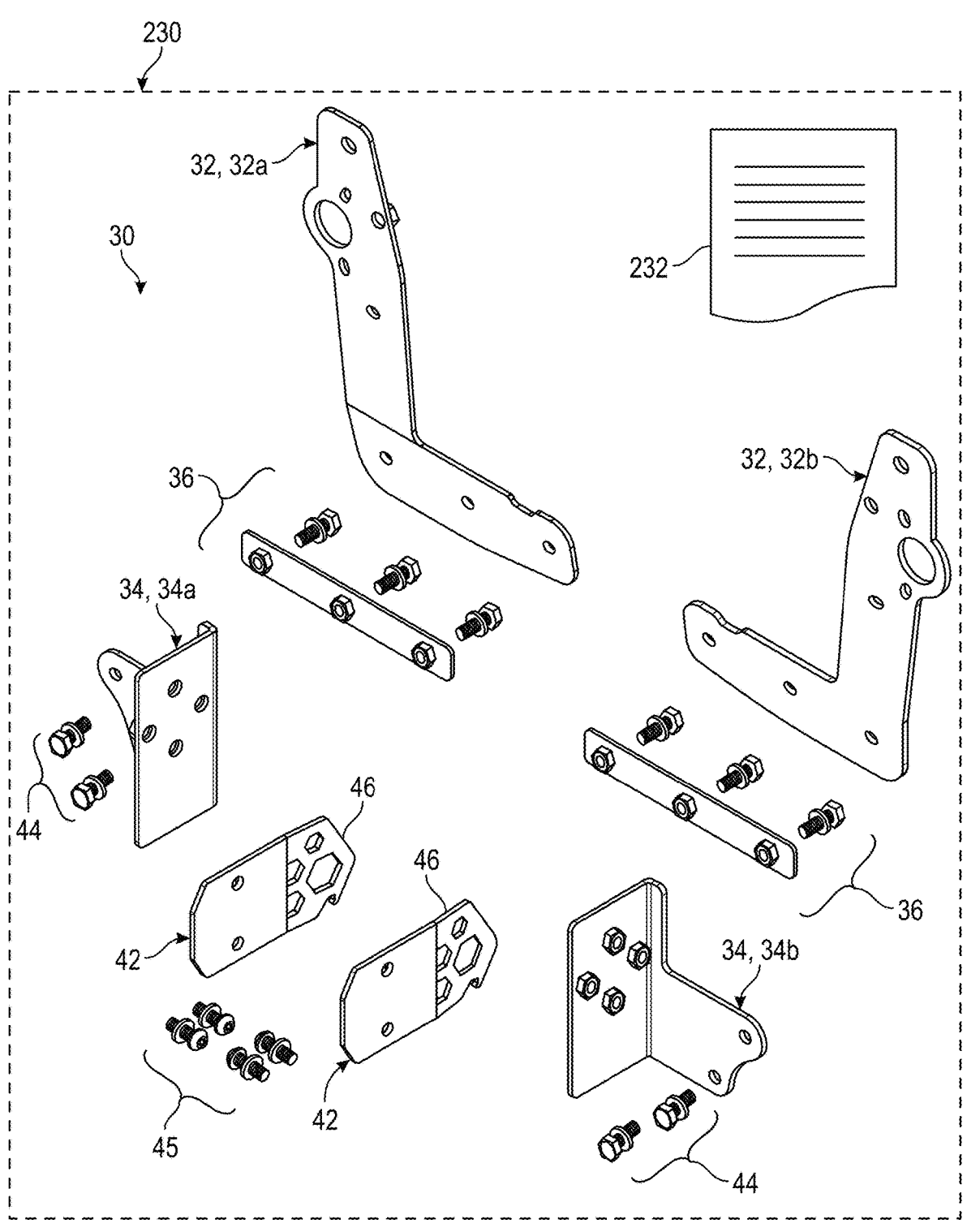
FIG. 2 is a perspective view of components of a kit including a bed stiffener assembly according to an embodiment of the disclosure.

Referring to FIG. 2, a bed stiffener assembly 30 is depicted according to an embodiment of the disclosure. The bed stiffener assembly 30 includes a pair of stiffener brackets 32a, 32b, a pair of mounting brackets 34a, 34b, and a pair of fastening assemblies 36 for coupling to the stiffener brackets 32. Herein, the stiffener brackets and mounting brackets are referred to generically or collectively by reference characters 32 and 34, respectively, and uniquely or individually by these reference characters followed by a letter prefix (e.g., "stiffener bracket 32a" and "mounting bracket 34b"). The bed stiffener assembly 30 may also include one or more anchor plates 42, as well as associated fasteners 44 and 45 for coupling the mounting brackets 34 to the stiffener brackets 32 and the anchor plate(s) 42, respectively. In some embodiments, one or more of the anchor plates 42 include a tie down bracket 46.

Figure 3:
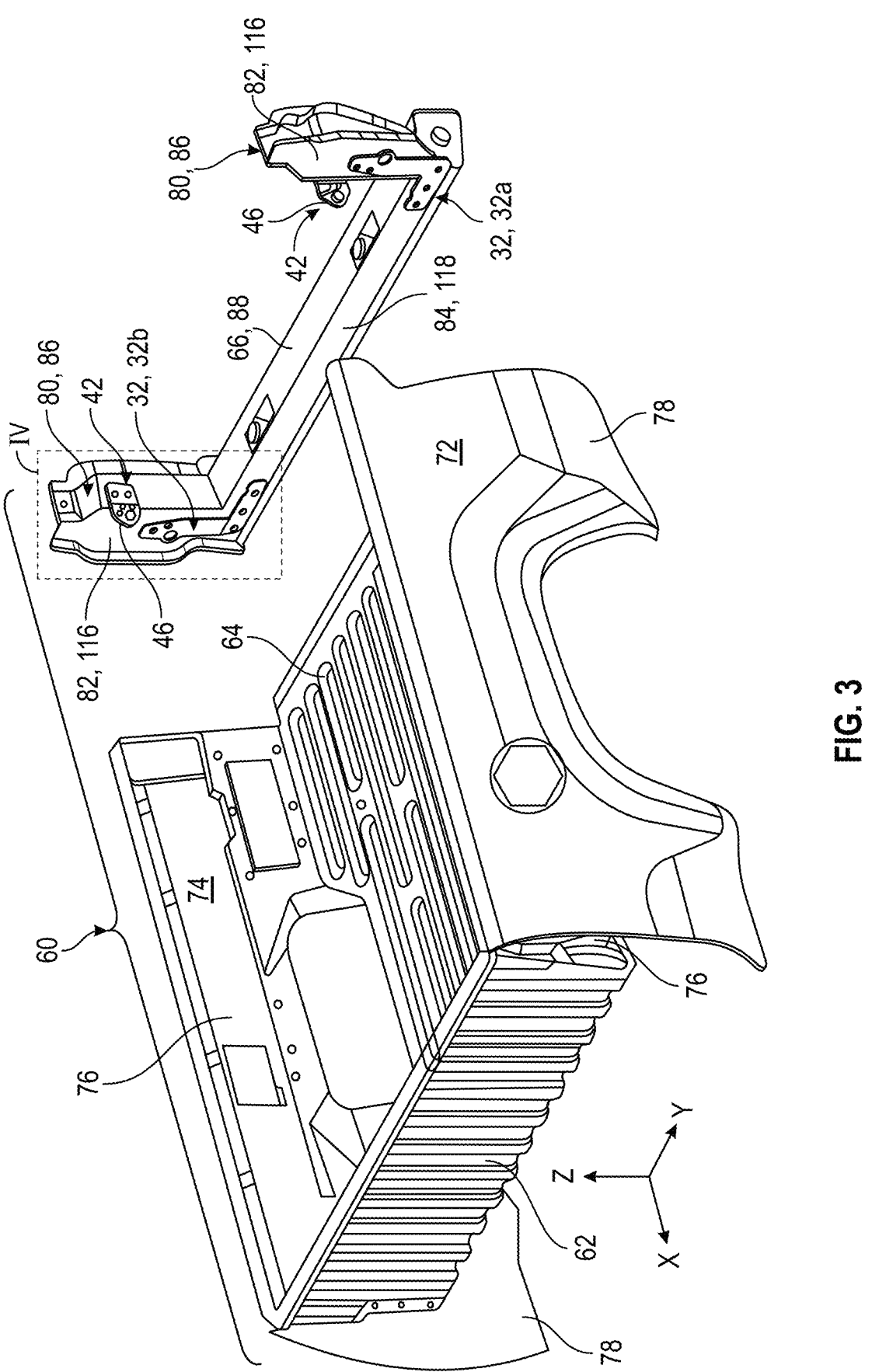
FIG. 3 is a partially exploded perspective view of a truck box with the bed stiffener assembly of FIG. 2 installed according to an embodiment of the disclosure.
Figure 4:
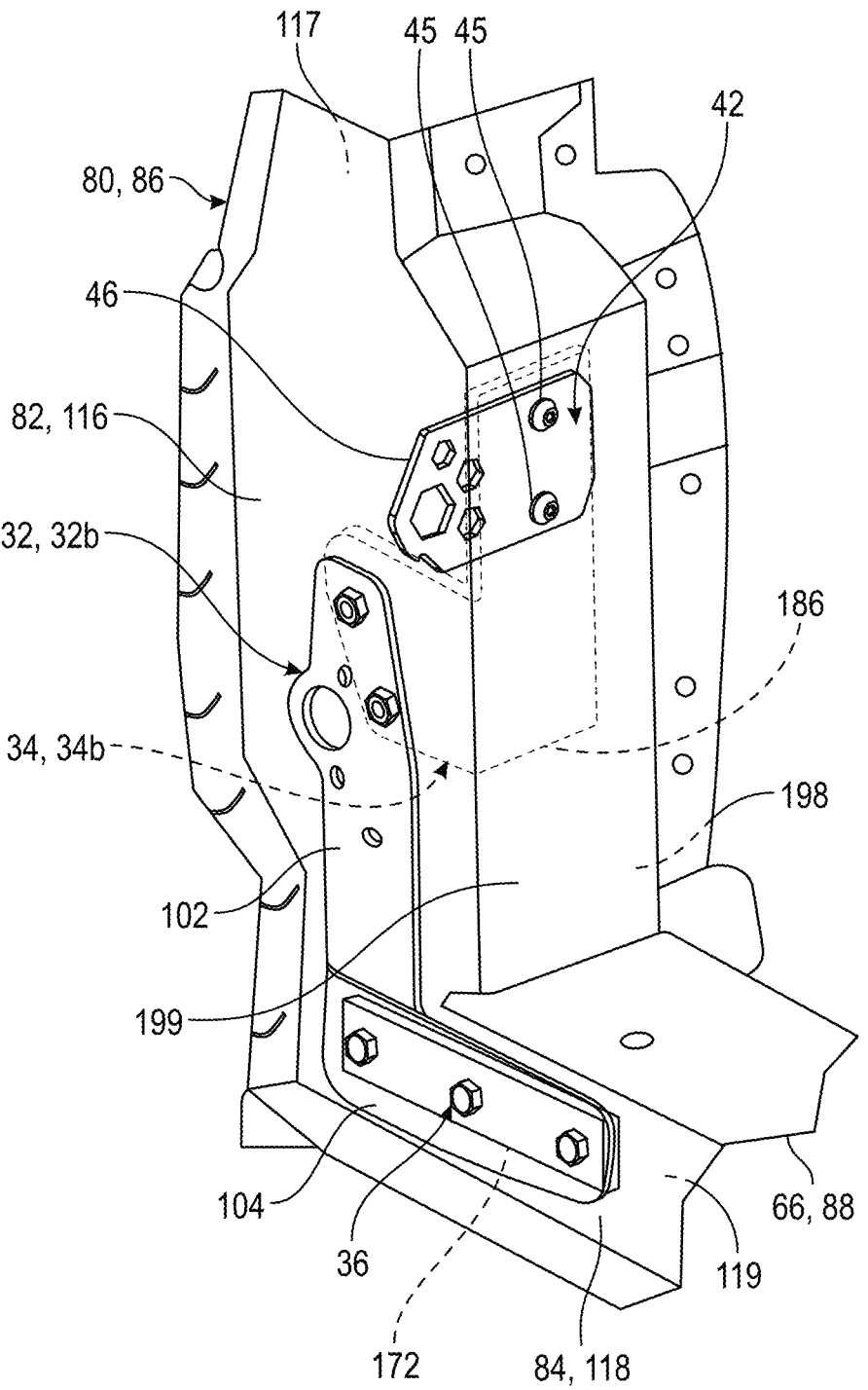
FIG. 4 is an enlarged view of inset IV of FIG. 3 according to an embodiment of the disclosure.
Figure 5:
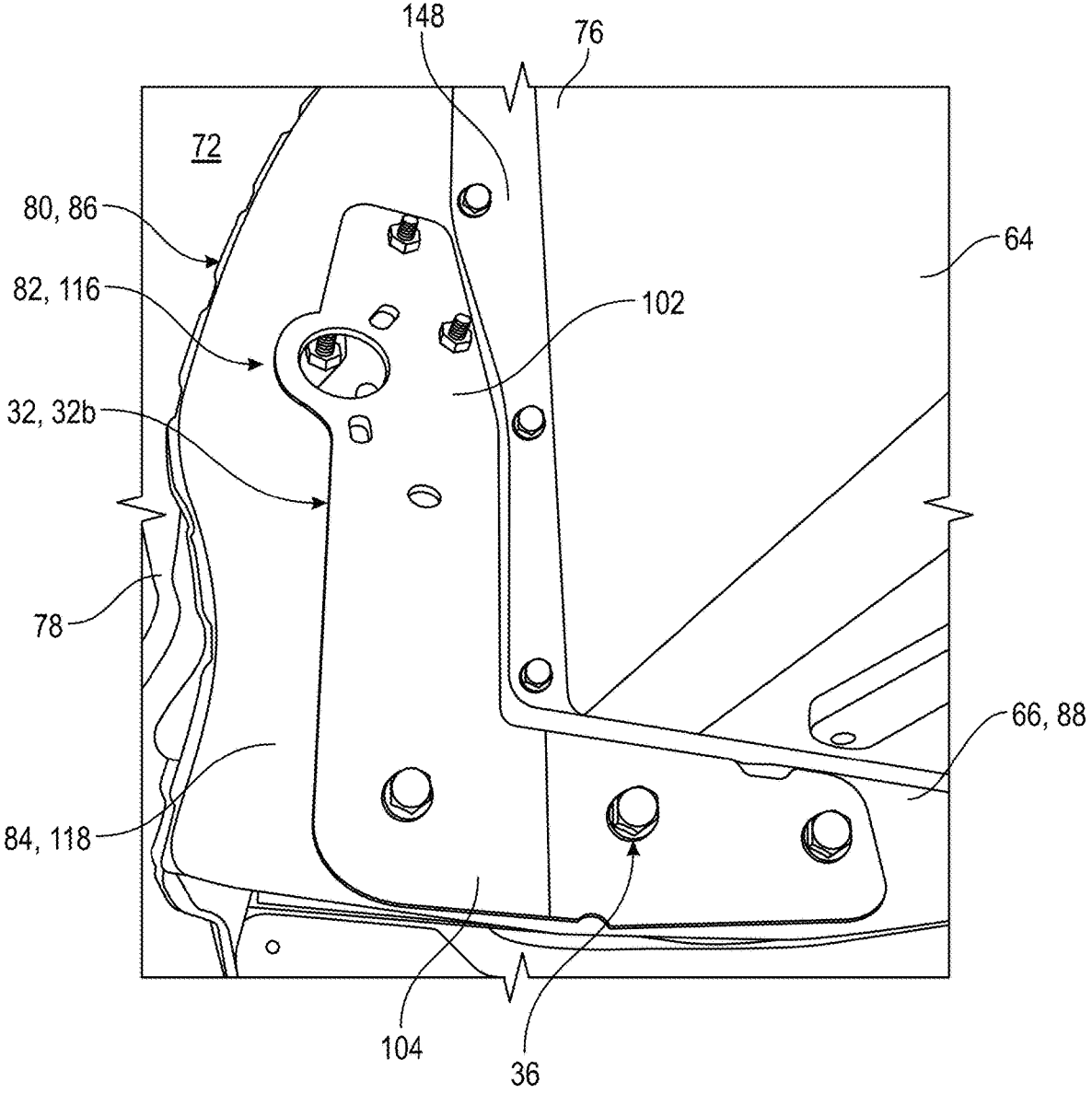
FIG. 5 is a photograph of a support pillar within a sidewall of a truck box with the bed stiffener assembly of FIG. 2 installed according to an embodiment of the disclosure.
Figure 6:
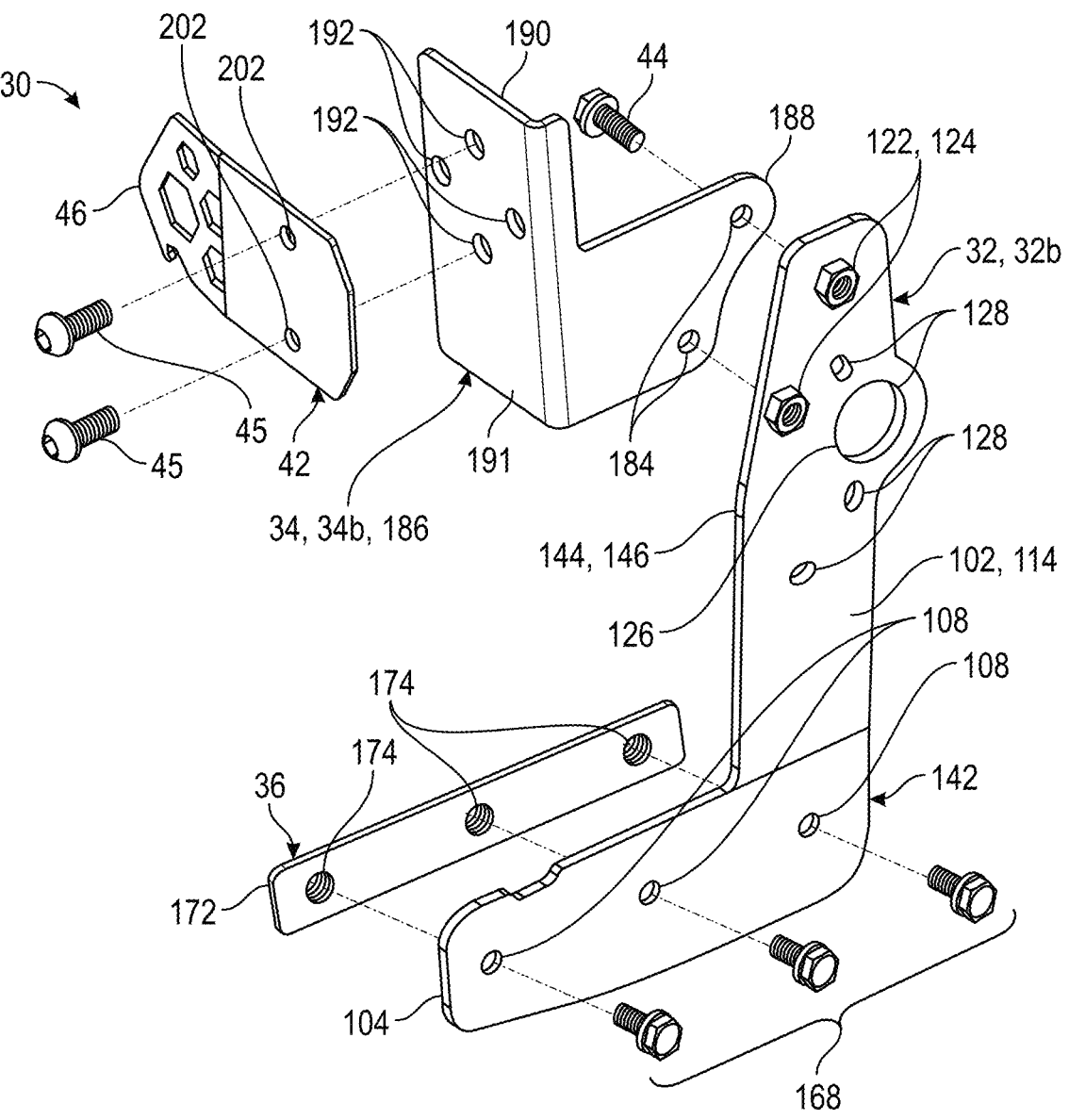
FIGS. 6 and 7 are exploded perspective views of components of the bed stiffener assembly of FIG. 2 according to an embodiment of the disclosure.
Figure 7:
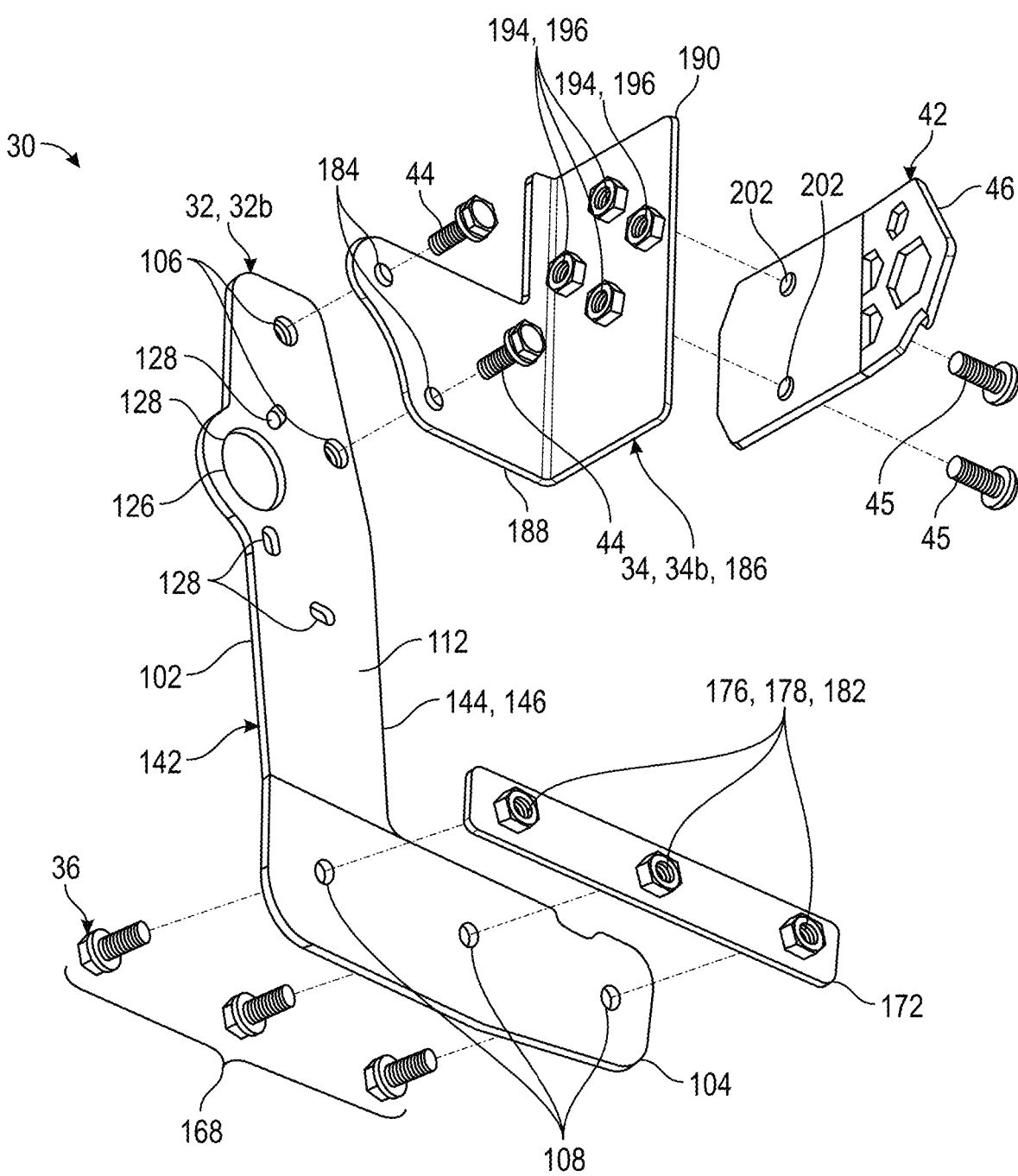
Figure 8:
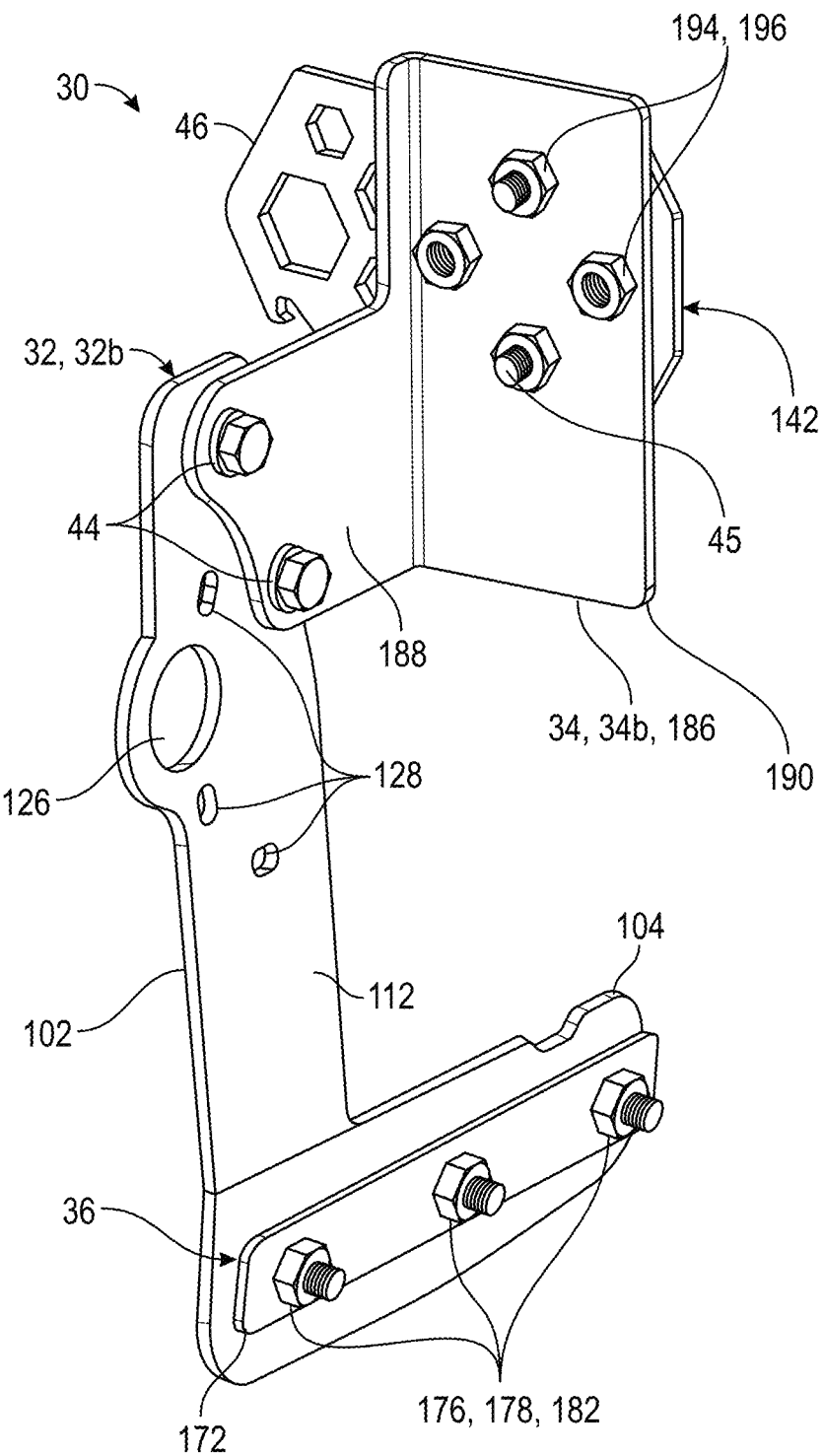
FIGS. 8 and 9 are assembled perspective views of components of the bed stiffener assembly of FIG. 2 according to an embodiment of the disclosure.
Figure 9:
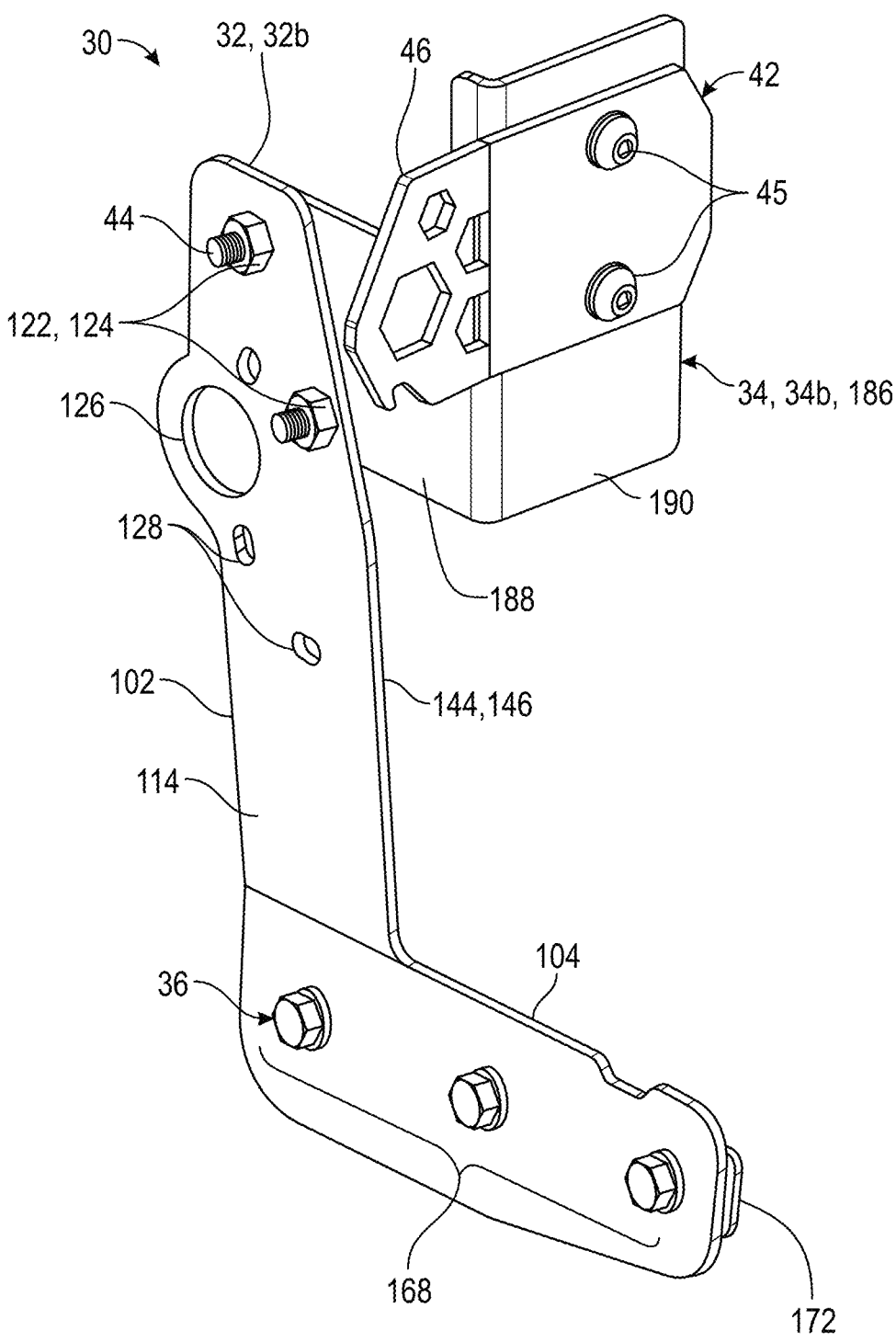
Figure 10:
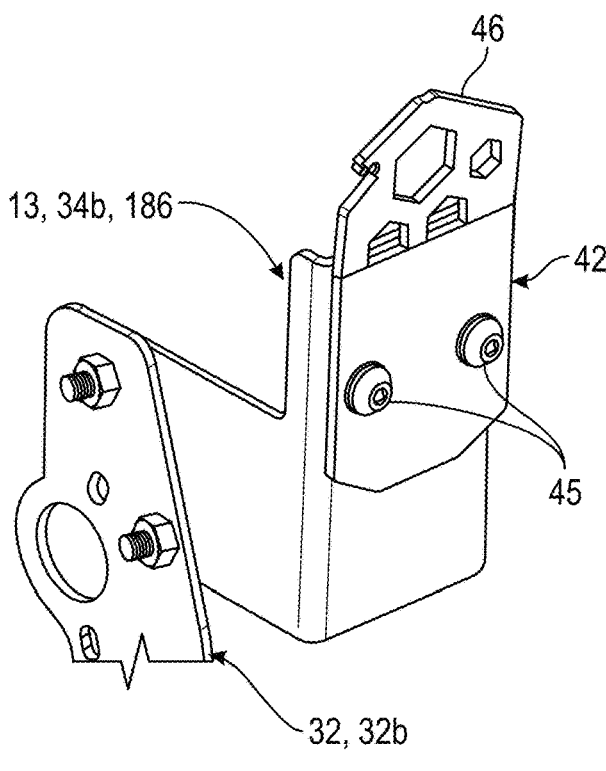
FIG. 10 is a partial perspective view of the assembled components of FIG. 9 with an anchor plate in a different orientation according to an embodiment of the disclosure.
Figure 11:
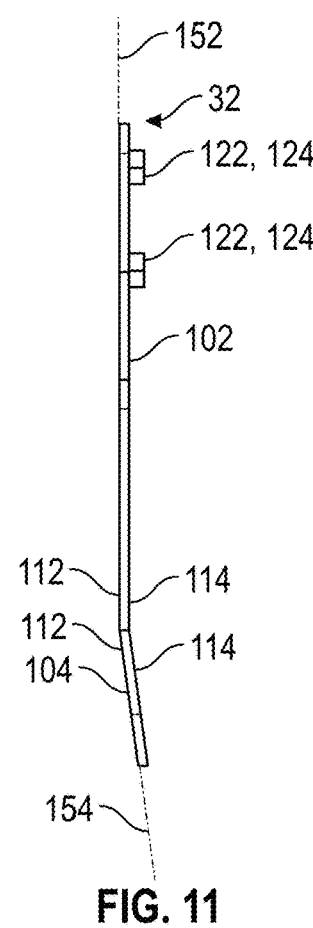
FIG. 11 is a side elevational view of a stiffener bracket of the kit of FIG. 2 according to an embodiment of the disclosure.

Referring to FIGS. 3 through 5, a bed stiffener assembly 30 installed on a truck box 60 is depicted according to an embodiment of the disclosure. The truck box 60 includes a front panel 62, a floor panel 64, and a cross member 66 that extend laterally between a first side wall 72 and a second side wall 74. Each side wall 72, 74 may include an inner panel 76, an outer panel 78, and a pair of support pillars 80 that are positioned at opposed lateral ends of the cross member 66. The bed stiffener assembly 30 is depicted as mounted to the forward faces 82 and 84 of the support pillars 80 and cross member 66, respectively. As such, the components of the bed stiffener assembly 30 are disposed within the side walls 72 and 74 and beneath the floor panel 64 of the truck box 60.

In some embodiments, the stiffener bracket 32b and mounting bracket 34b are mirror images of stiffener bracket 32a and mounting bracket 34a, respectively. As such, mounting bracket 34a is configured for coupling with stiffener bracket 32a on the first side wall 72 (e.g., "driver side") and mounting bracket 34b is configured for coupling with stiffener bracket 32b on a second side wall 74 (e.g., "passenger side") of the truck box 60.

For the depicted embodiment, the support pillars 80 are rear corner uprights 86 configured to receive taillights (not depicted), and the cross member 66 is a rear sill 88. This aspect of the depicted embodiment is non-limiting. That is, installation of the bed stiffener assembly 30 at cross members and side wall supports that are intermediate the front panel 62 and the rear corner uprights 86 is contemplated.

A Cartesian reference coordinate 100 for the truck box 60 is depicted in FIG. 3. The purpose of the reference coordinate 100 is to establish direction terminology. As such, the origin of the reference coordinate is arbitrary, with the x-z plane being equidistant between the side walls 72 and 74. Herein, the a direction parallel to the x-axis is referred to as "axial," with the positive x-direction being referred to as "forward" or "fore" and the negative x-direction being referred to as "rearward" or "aft." A direction parallel to the y-axis is referred to as "lateral" or "horizontal," and a direction parallel to the z-axis is referred to as "vertical." A direction that is toward the x-z plane is referred to as "inward," and a direction that is away from the x-z plane is referred to as "outward."

Referring to FIGS. 6 through 12, the components of the bed stiffener assembly 30 are described in greater detail according to embodiments of the disclosure. Each stiffener bracket 32 includes a vertical leg 102 and a horizontal leg 104, the horizontal leg 104 depending from the vertical leg 102. The vertical leg 102 defines at least one mounting hole 106, and the horizontal leg 104 defines a plurality of mounting holes 108. The vertical leg 102 and the horizontal leg 104 define a flush contact surface 112 and an opposed access face 114, the flush contact surface 112 being in contact with the support pillar 80 and the cross member 66 when installed. Herein, "vertical" and "horizontal" refer to the general orientation of the respective legs 102 and 104 when installed on the truck box 60.

The vertical leg 102 is configured for attachment to a mounting face 116 of the support pillar 80, the mounting face 116 being situated between the inner panel 76 and the outer panel 78 of the truck box 60 (e.g., the forward face 82). The horizontal leg 104 is configured for attachment to a mounting face 118 of a cross member 66 and underneath the floor panel 64 of the truck box 60 (e.g., the forward face 84). The support pillar 80 and cross member 66 include opposed faces 117 and 119 that are opposite the respective mounting faces 116 and 118.

In some embodiments, the mounting hole(s) 106 of the vertical leg 102 is/are tapped. Each of the mounting hole(s) 106 of the vertical leg 102 may pass through the vertical leg 102. In some embodiments, a threaded component 122 is aligned with the at least one mounting hole 106 of the vertical leg. The threaded component 122 may be affixed to the vertical leg 102, for example by welding. In some embodiments, the threaded component 122 is a nut 124 (depicted). Other threaded components are contemplated, such as a threaded collar or a threaded bushing. The stiffener bracket 32 may define a through-aperture 126 for passage of electrical wiring therethrough. In some embodiments, the stiffener bracket 32 defines an original equipment (OE) pattern 128 that match the pattern and shapes of original equipment (OE) holes defined by the support pillar 80 (e.g., of the rear corner upright 86). In some embodiments, the OE pattern 128 includes the through aperture 126.

Figure 12:
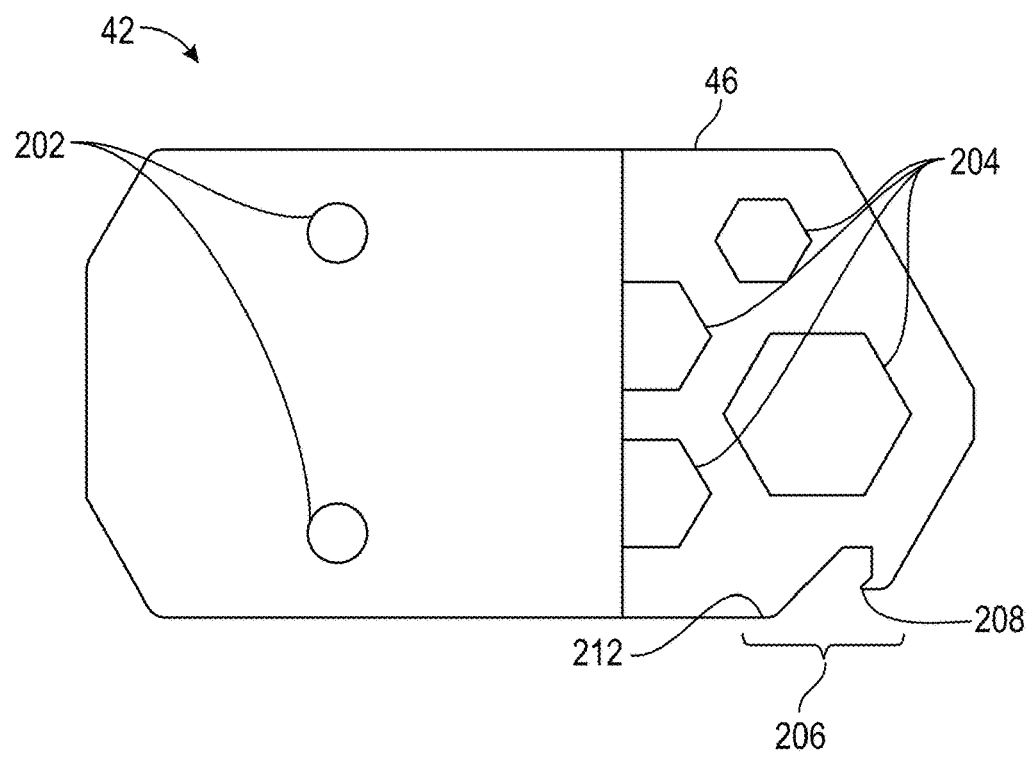
FIG. 12 is a plan view of an anchor plate and tie down bracket of the kit of FIG. 2 according to an embodiment of the disclosure.

In the depicted embodiment, the vertical leg 102 and horizontal leg 104 of the stiffener bracket 32 cooperate to define a "L" shape 142. This aspect of the depicted embodiment is non-limiting. Other overall shapes defined by the vertical leg 102 and the horizontal leg 104 are contemplated, for example a "J" shape or an inverted "T" shape. In some embodiments, an inside edge 144 of the vertical leg 102 of the stiffener bracket 32 defines a profiled shape 146 of that traces the shape of a flange 148 (FIG. 5) that joins the inner panel 76 of the truck box 60 to the support pillar 80, or the contour of the inner panel 76 generally. The vertical leg 102 may define a first plane 152 at the flush contact surface 112, and the horizontal leg 104 may define a second plane 154 at the flush contact surface 112. In some embodiments, the first and second planes 152 and 154 are non-parallel (FIG. 12). The stiffener bracket 32 does not include a flange or rib that extends beyond the flush contact surface 112 of the stiffener bracket 32. In the depicted embodiment, the stiffener bracket 32 also does not include any flange or rib that extends orthogonally with respect to the flush contact surface 112 (e.g., from the access face 114), although convex ribs and edge flanges that extend proud relative to the access face 114 is contemplated.

The fastening assemblies 36 include a plurality of fasteners 168, each associated with a corresponding one of the mounting holes 108 of the horizontal leg 104. Each fastening assembly 36 may include a backing plate 172 configured for attachment to the opposed face 119 of the mounting face 116 of the cross member, the backing plate 172 defining a plurality of holes 174.

Each fastening assembly 32 includes a plurality of female threaded elements 176. Each female threaded element 176 is associated with a corresponding one of the plurality of mounting holes 108 of the horizontal leg 104 of the associated stiffener bracket 32. The plurality of holes 174 and female threaded elements 176 are arranged for alignment with the plurality of mounting holes 108 of the horizontal leg 104 to receive the fasteners 168. In some applications, the mounting face 116 of the cross member 66 is forward facing and the opposed face 119 is rearward facing.

In some embodiments, the plurality of female threaded elements 176 are tapped walls (not depicted) of the holes 174. In some embodiments, plurality of female threaded elements 176 are separate components 178 that are aligned with the holes 174, the holes 174 being through-holes.

In some embodiments, the separate components 178 are nuts 182. Other forms of the separate components 178 are contemplated, for example threaded collars or threaded bushings. In some embodiments, the separate components 178 are affixed to the backing plate 172, for example by welding.

The mounting brackets 34 each define at least one mounting hole 184. Each mounting hole 184 corresponds to a given mounting hole 106 of the vertical leg 102 of the associated mounting bracket 34. In some embodiments, the mounting bracket 34 is a corner bracket 186 that includes non-parallel first and second tabs 188 and 190 which may be orthogonal to each other. The first tab 188 is for coupling to the associated stiffener bracket 32 and defines the mounting hole(s) 184. The second tab 190 may include a contact face 191 that contacts the support pillar 80 and defines at least one mounting hole 192. The mounting hole(s) 192 may be through-holes, and may be tapped for receiving a corresponding vertical leg fastener or fasteners 44. Alternatively or in addition, the mounting hole(s) 192 may be aligned with a female threaded component or components 194, such as nuts 196. The female threaded component(s) 194 may be affixed to the second tab 190, for example by welding.

The anchor plate(s) 42, when implemented with the corner bracket(s) 186, is coupled to the second tab 190 of the corner bracket 186. In some embodiments, the contact face 191 of the second tab 190 is configured to register against an opposed face 198 of a lateral portion 199 of the support pillar 80 (FIG. 4) to face laterally inward when installed on the truck box 60. Each anchor plate 42 defines at least one mounting aperture 202. The anchor plate 42 may be coupled to the corner bracket 186 with one or more of the fasteners 45.

In some embodiments, the anchor plate 42 includes the tie down bracket 46 (FIG. 12). The tie down bracket 46 may include a plurality of through-apertures 204. In some embodiments, the tie down bracket 46 includes a bottle opener 206. The bottle opener 206 may include a tooth 208 and a fulcrum 212 for removal of crown bottle caps. In some embodiments, the mounting hole(s) 192 of the second tab 190 define a pattern that cooperates with the mounting aperture(s) 202 of the anchor plate 42 to enable the tie down bracket 46 to be oriented in one of a plurality of orientations when mounted to the corner bracket 186 (compare FIGS. 9 and 10).

Figure 13:
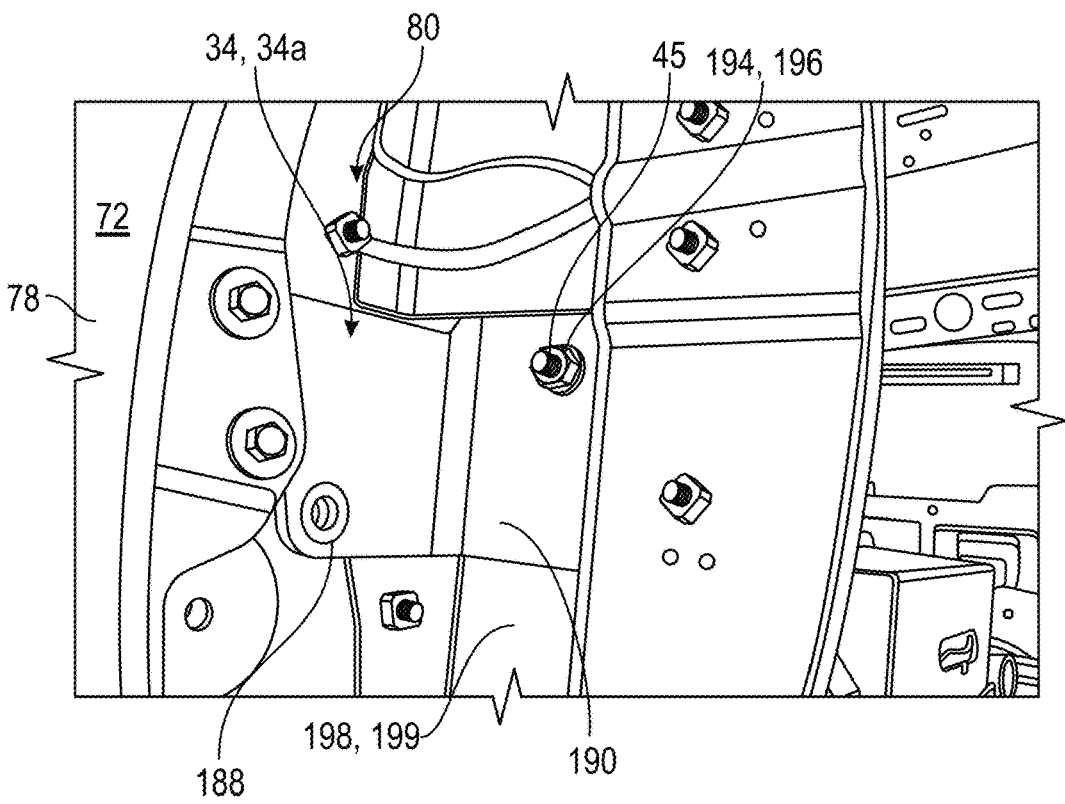
FIG. 13 is a photograph of a mounting bracket mounted on a rearward end of a side wall of a truck box during installation of the bed stiffener assembly of FIG. 2 according to an embodiment of the disclosure.
Figure 14:
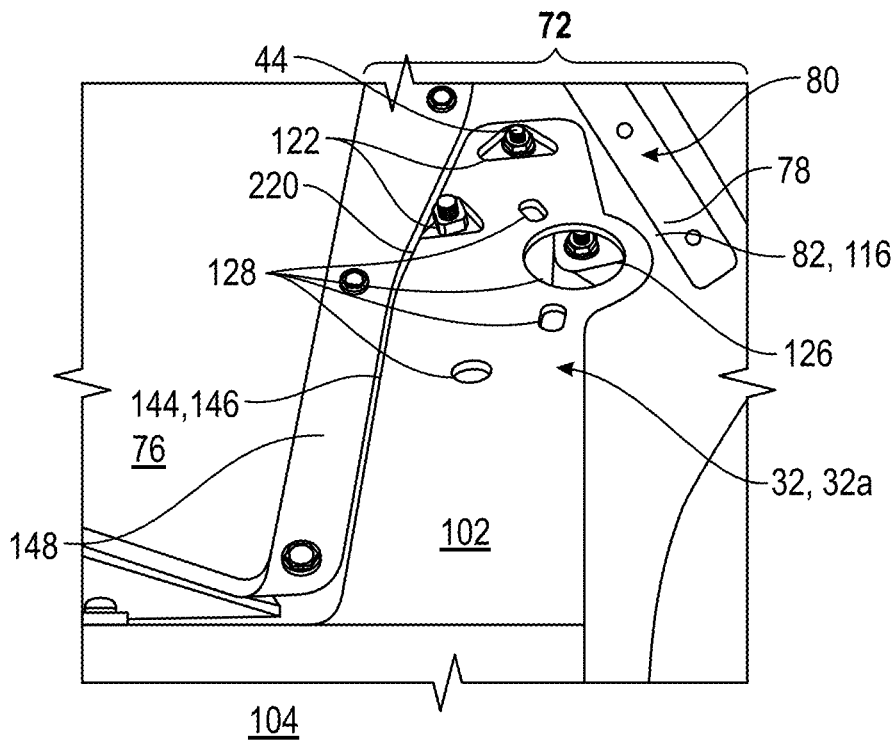
FIGS. 14 and 15 are photographs of a support pillar within a sidewall of a truck box during installation of the bed stiffener assembly of FIG. 2 according to an embodiment of the disclosure.
Figure 15:
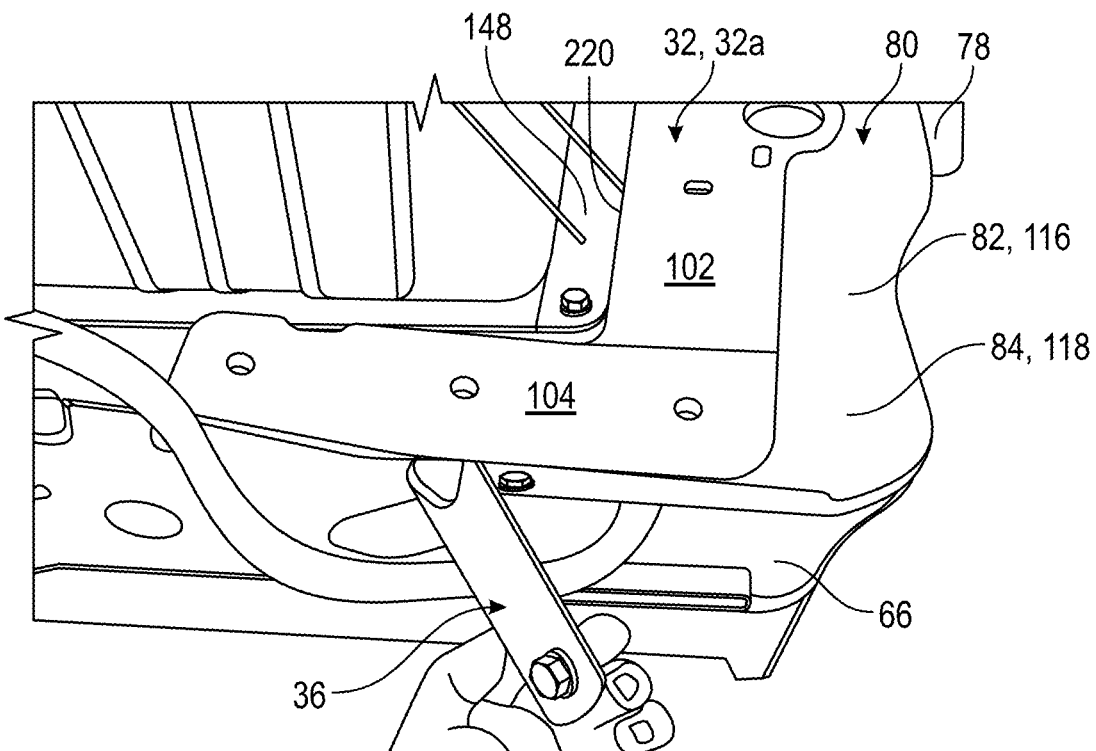

Referring to FIGS. 13 through 15, installation of the bed stiffener assembly 30 is depicted according to an embodiment of the disclosure. These figures depict installation of stiffener bracket 32a and mounting bracket 34a on a rear corner upright 86 of side wall 72 (i.e., conventionally the "drivers side" in the United States). The method may be implemented, mutatis mutandis, with either of the stiffener brackets 32 and mounting brackets 34 and on support pillars 80 other than rear corner uprights 86. Additional details regarding installation of the bed stiffener assembly 30 is provided in the Appendix.

The mounting bracket 34 is mounted to the support pillar 80. For embodiments where the mounting bracket 34 is a corner bracket 186, the first tab 188 is registered against the opposed face 117 of the support pillar 80, and the second tab 190 is registered against the opposed face 198 of the lateral portion 199 of the support pillar 80 (FIG. 13). The mounting bracket 34 may be initially held in place by attachment to the anchor plate 42 through the lateral portion 199 of the support pillar 80, for example with faster(s) 45 mated to the female threaded component(s) 194.

The stiffener bracket 32 is mounted to the mounting bracket 34 through the support pillar. In some embodiments, the OE hole pattern 128 is aligned with an identical or similar pattern that is present on the mounting face 116 of the support pillar 80. In some embodiments, the profiled shape 146 of the inside edge 144 of the vertical leg 102 of the stiffener bracket 32 is positioned adjacent the flange 148 of the inner panel 76 or, alternatively, adjacent the inner 76 itself to define an even gap or reveal 220 along the profiled shape 146, between the inside edge 144 and the flange 148 or panel 76 (FIG. 14). The vertical leg 102 is attached to the mounting bracket 34 (e.g., the first tab 188 of corner bracket 186) through mounting face 116 of the support pillar 80. The fastening assembly 36 is positioned and aligned on the opposed face 119 of the cross member 66 and attached to the horizontal leg 104 of the stiffener bracket 32 through the mounting face 118 of the cross member 66 (FIG. 15).

Functionally, the bed stiffener assembly 30 enables mounting within the side walls 72, 74 and below the floor panel 64, enhancing the structural integrity of the truck box 60 in a way that is unobtrusive to loading/unloading and that maintains the factory appearance of the truck box 60.

The mounting of the stiffener brackets 32 directly to the support pillar 80 and cross member 66 provides lateral stiffness (i.e., in the y-z plane). In addition to the lateral stiffness provided by the stiffener brackets 32, the corner bracket 186 provides stiffness in the fore/aft directions of the truck box 60. The non-parallel planes 152 and 154 defined by the flush contact surface 112 may approximate a profile across the mounting surfaces 116 and 118 for a more secure engagement between the stiffener bracket 32 and the support pillar 80 and cross member 66.

Alignment of the OE hole pattern with OE holes on the support pillars 80, as well as the profile shape 146 of the inner edge 144 of vertical upright I 02, aid in positioning of the stiffener brackets 32 during installation. Integration of the female threaded elements 176 and the backing plate 172 of the fastening assembly 36 facilitates handling and alignment during installation. The multiple additional through-apertures 204 of the tie down bracket 46 provides additional ways to enhance the securing of payloads. The bottle opener 206 expands recreational use of the truck box 10 60 and tailgate In some embodiments, the bed stiffener assembly 30 is provided as a kit 230 (FIG. 2) for retrofitting an existing truck bed 60. The kit 230 includes some or all of the components of the bed stiffener assembly 30 and a set of installation instructions 232. The installation instructions 232 may include assembly and installation procedures as detailed in this disclosure. The installation instructions 232 are provided on a tangible, non-transitory medium such as on a printed document (depicted), compact disc, or flash drive. Non-limiting examples of a tangible, non-transitory medium include a paper document and computer-readable media including compact disc and magnetic storage devices (e.g., hard disk, flash drive, cartridge, floppy drive). The computer-readable media may be local or accessible over the internet. The installation instructions 232 may be complete on a single medium, or divided among two or more media. For example, some of the installation instructions 232 may be written on a paper document that instruct the user to access one or more of the steps of the method over the internet, the internet-accessible steps being stored on a computer-readable medium or media. The installation instructions 232 may embody the techniques and methods depicted or described herein (including the Appendix) using text, photos, videos, or a combination thereof to instruct and guide the user. The instructions may be in the form of written words, figures, photos, video presentations, or a combination thereof to instruct and guide the user.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment (s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. A bed stiffener assembly for a truck box, comprising: a stiffener bracket including:
   a vertical leg configured for attachment to a mounting face of a support pillar of a truck box and between an inner panel and an outer panel of said truck box, said vertical leg defining at least one mounting hole; and
   a horizontal leg that depends from said vertical leg, said horizontal leg being configured for attachment to a mounting face of a cross member of said truck box and underneath a floor panel of said truck box, said horizontal leg defining a plurality of mounting holes, wherein said vertical leg and said horizontal leg define a flush contact surface for registration against said support pillar and said cross member;
   a fastening assembly including a plurality of fasteners, each fastener of said plurality of fasteners being associated with a corresponding mounting hole of said plurality of mounting holes of said horizontal leg for coupling said fastening assembly to said horizontal leg of said stiffener bracket;
   a mounting bracket defines at least one mounting hole, each of said at least one mounting hole being associated with a corresponding mounting hole of said at least one mounting hole of said vertical leg; and
   at least one vertical leg fastener, each of said at least one vertical leg fastener being associated with a corresponding mounting hole of said at least one mounting hole of said vertical leg for coupling the mounting bracket to the vertical leg of the stiffener bracket.

2. The bed stiffener assembly of claim 1, wherein said support pillar is a rear corner upright.

3. The bed stiffener assembly of claim 1, wherein said mounting face of said support pillar is forward facing.

4. The bed stiffener assembly of claim 1, wherein said mounting face of said cross member is forward facing.

5. The bed stiffener assembly of claim 1, wherein said at least one mounting hole of said vertical leg is tapped.

6. The bed stiffener assembly of claim 1, wherein said at least one mounting hole of said vertical leg passes through said vertical leg.

7. The bed stiffener assembly of claim 6, wherein a threaded component is aligned with said at least one mounting hole of said vertical leg.

8. The bed stiffener assembly of claim 7, wherein said threaded component is welded to said stiffener bracket.

9. The bed stiffener assembly of claim 7, wherein said threaded component is a nut.

10. The bed stiffener assembly of claim 1, wherein said stiffener bracket defines a through-aperture for passage of electrical wiring therethrough.

11. The bed stiffener assembly of claim 1, wherein said stiffener bracket defines a plurality of holes that match shapes and a pattern of original equipment holes of said support pillar.

12. The bed stiffener assembly of claim 1, wherein said vertical leg and said horizontal leg of said stiffener bracket cooperate to define an "L" shape.

13. The bed stiffener assembly of claim 1, wherein an inside edge of said vertical leg of said stiffener bracket defines a profile of a flange that joins said inner panel of said truck box to said support pillar.

14. The bed stiffener assembly of claim 1, wherein:
   said vertical leg defines a first plane at said flush contact surface;
   said horizontal leg defines a second plane at said flush contact surface; and
   said first plane and said second plane are non-parallel.

15. The bed stiffener assembly of claim 1, wherein said stiffener bracket does not include a flange that extends orthogonally with respect to said flush contact surface.

16. The bed stiffener assembly of claim 1, wherein said fastening assembly includes a backing plate configured for attachment to an opposed face of said mounting face of said cross member, said fastening assembly including a plurality of female threaded components, each female threaded component of said plurality of female threaded components being associated with a corresponding mounting hole of said plurality of mounting holes of said horizontal leg, said plurality of female threaded components being arranged for alignment with said plurality of mounting holes of said horizontal leg to receive said plurality of fasteners.

17. The bed stiffener assembly of claim 16, wherein said plurality of female threaded components are tapped through-holes defined by said backing plate.

18. The bed stiffener assembly of claim 16, wherein said female threaded components are nuts.

19. The bed stiffener assembly of claim 16, wherein said plurality of threaded components are affixed to said backing plate.

20. The bed stiffener assembly of claim 16, wherein said mounting face of said support pillar is forward facing and said opposed face is rearward facing.

21. The bed stiffener assembly of claim 1, wherein said mounting bracket is a corner bracket that defines said at least one mounting hole on a first tab and at least one mounting hole on a second tab, said first tab being non-parallel to said second tab.

22. The bed stiffener assembly of claim 21, wherein said first tab of said corner bracket is orthogonal to said second tab.

23. The bed stiffener assembly of claim 21, wherein said at least one mounting hole of said second tab is tapped.

24. The bed stiffener assembly of claim 21, wherein said at least one mounting hole of said second tab passes through said second tab.

25. The bed stiffener assembly of claim 21, wherein said second tab of said corner bracket includes a contact face that is faces laterally inward when installed on said truck box.

26. The bed stiffener assembly of claim 25, wherein a threaded component is aligned with said at least one mounting hole of said second tab.

27. The bed stiffener assembly of claim 26, wherein said threaded component is welded to said second tab.

28. The bed stiffener assembly of claim 26, wherein said threaded component is a nut.

29. The bed stiffener assembly of claim 21, comprising an anchor plate for coupling to said second tab of said corner bracket.

30. The bed stiffener assembly of claim 29, wherein said anchor plate defines at least one mounting aperture.

31. The bed stiffener assembly of claim 29, wherein said anchor plate is coupled to said corner bracket with fasteners.

32. The bed stiffener assembly of claim 29, wherein said anchor plate includes a tie down bracket.

33. The bed stiffener assembly of claim 32, wherein said at least one mounting hole of said second tab defines a pattern that cooperates with said at least one mounting aperture of said tie down bracket to enable said tie down bracket to be oriented in one of a plurality of orientations when mounted to said corner bracket.

34. The bed stiffener assembly of claim 32, wherein said tie down bracket includes a plurality of through-apertures.

35. The bed stiffener assembly of claim 32, wherein said tie down bracket includes a bottle opener.

36. The bed stiffener assembly of claim 35, wherein said bottle opener includes a tooth and a fulcrum for removal of crown bottle caps.

37. The bed stiffener of claim 36, wherein said corner bracket is configured for installation within a rear corner support pillar of said truck box.

38. A method for stiffening a truck box, the method comprising:

providing a kit that includes a stiffener bracket; and
providing a set of installation instructions on a tangible, non-transitory medium, said installation instructions including:

securing a vertical leg of a stiffener bracket to a first face of a support pillar of the truck box, said first face of said support pillar being between an inner panel and an outer panel of a side wall of said truck box; and securing a horizontal leg of said stiffener bracket to a first face of a cross member that extends below said support pillar, said first face of said cross member being underneath a floor panel of said truck box;

positioning a mounting bracket of the kit on a second face of said support pillar, said second face of said support pillar being opposite said first face of said support pillar, the mounting bracket defining at least one mounting hole, the bracket positioned on said second face of said support pillar such that each mounting hole of said at least one mounting hole is associated with a corresponding mounting hole defined by said vertical leg of said stiffener bracket;

coupling said stiffener bracket to said mounting bracket to secure said stiffener bracket to said first mounting face of said support pillar; and installing the stiffener bracket according to the installation instructions to stiffen the truck box.

39. The method of claim 38, wherein
said kit provided in the step of providing said kit includes an anchor plate, and said installation instructions provided in the step of providing said installation instructions include:

positioning said mounting bracket on a third face of said support pillar, said third face of said support pillar extending orthogonally to said second face of said support pillar;

positioning said anchor plate on a fourth face of said support pillar, said fourth face of said support pillar extending orthogonally said first face of said support pillar; and coupling said anchor plate to said mounting bracket to secure said mounting bracket to said third mounting face of said support pillar.

40. The method of claim 38, wherein said kit provided in the step of providing said kit includes a fastener assembly, and said installation instructions provided in the step of providing said installation instructions include:

positioning a backing plate of said fastener assembly to a second face of said cross member, said second face of said cross member being opposite said first face of said cross member; and coupling said stiffener bracket to said backing plate to secure said stiffener bracket to said first mounting face of said cross member.

41. A bed stiffener assembly for a truck box, consisting of:
a stiffener bracket including:

a vertical leg configured for attachment to a mounting face of a support pillar of a truck box and between an inner panel and an outer panel of said truck box, said vertical leg defining at least one mounting hole; and a horizontal leg that depends from said vertical leg, said horizontal leg being configured for attachment to a mounting face of a cross member of said truck box and underneath a floor panel of said truck box, said horizontal leg defining a plurality of mounting holes, wherein said vertical leg and said horizontal leg define a flush contact surface for registration against said support pillar and said cross member;

a fastening assembly including a plurality of fasteners, each fastener of said plurality of fasteners being associated with a corresponding mounting hole of said plurality of mounting holes of said horizontal leg for coupling said fastening assembly to said horizontal leg of said stiffener bracket;

a mounting bracket defines at least one mounting hole, each of said at least one mounting hole being associated with a corresponding mounting hole of said at least one mounting hole of said vertical leg; and at least one vertical leg fastener, each of said at least one vertical leg fastener being associated with a corresponding mounting hole of said at least one mounting hole of said vertical leg for coupling the mounting bracket to the vertical leg of the stiffener bracket.

42. The bed stiffener assembly of claim 41, wherein said support pillar is a rear corner upright, wherein said mounting face of said support pillar is forward facing.

43. The bed stiffener assembly of claim 42, wherein said mounting face of said cross member is forward facing, wherein said at least one mounting hole of said vertical leg is tapped, wherein said at least one mounting hole of said vertical leg passes through said vertical leg, wherein a threaded component is aligned with said at least one mounting hole of said vertical leg.

44. The bed stiffener assembly of claim 43, wherein said threaded component is welded to said stiffener bracket, wherein said threaded component is a nut, wherein said stiffener bracket defines a through-aperture for passage of electrical wiring therethrough, wherein said stiffener bracket defines a plurality of holes that match shapes and a pattern of original equipment holes of said support pillar.

45. The bed stiffener assembly of claim 44, wherein said vertical leg and said horizontal leg of said stiffener bracket cooperate to define an "L" shape, wherein an inside edge of said vertical leg of said stiffener bracket defines a profile of a flange that joins said inner panel of said truck box to said support pillar.

46. The bed stiffener assembly of claim 45, wherein:
said vertical leg defines a first plane at said flush contact surface;

said horizontal leg defines a second plane at said flush contact surface; and said first plane and said second plane are non-parallel, wherein said stiffener bracket does not include a flange that extends orthogonally with respect to said flush contact surface.

47. The bed stiffener assembly of claim 46, wherein said fastening assembly includes a backing plate configured for attachment to an opposed face of said mounting face of said cross member, said fastening assembly including a plurality of female threaded components, each female threaded component of said plurality of female threaded components being associated with a corresponding mounting hole of said plurality of mounting holes of said horizontal leg, said plurality of female threaded components being arranged for alignment with said plurality of mounting holes of said horizontal leg to receive said plurality of fasteners.

48. The bed stiffener assembly of claim 47, wherein said plurality of female threaded components are tapped through-holes defined by said backing plate, wherein said female threaded components are nuts, wherein said plurality of threaded components are affixed to said backing plate, wherein said mounting face of said support pillar is forward facing and said opposed face is rearward facing.

49. The bed stiffener assembly of claim 48, wherein said mounting bracket is a corner bracket that defines said at least one mounting hole on a first tab and at least one mounting hole on a second tab, said first tab being non-parallel to said second tab, wherein said first tab of said corner bracket is orthogonal to said second tab, wherein said at least one mounting hole of said second tab is tapped, wherein said at least one mounting hole of said second tab passes through said second tab.

50. The bed stiffener assembly of claim 49, wherein said second tab of said corner bracket includes a contact face that is faces laterally inward when installed on said truck box, wherein a threaded component is aligned with said at least one mounting hole of said second tab, wherein said threaded component is welded to said second tab, wherein said threaded component is a nut, comprising an anchor plate for coupling to said second tab of said corner bracket.

51. The bed stiffener assembly of claim 50, wherein said anchor plate defines at least one mounting aperture, wherein said anchor plate is coupled to said corner bracket with fasteners, wherein said anchor plate includes a tie down bracket, wherein said at least one mounting hole of said second tab defines a pattern that cooperates with said at least one mounting aperture of said tie down bracket to enable said tie down bracket to be oriented in one of a plurality of orientations when mounted to said corner bracket, wherein said tie down bracket includes a plurality of through-apertures, wherein said tie down bracket includes a bottle opener, wherein said bottle opener includes a tooth and a fulcrum for removal of crown bottle cap, wherein said corner bracket is configured for installation within a rear corner support pillar of said truck box.

* * * * *